US008445550B2

(12) United States Patent
Jothimurugesan et al.

(10) Patent No.: US 8,445,550 B2
(45) Date of Patent: May 21, 2013

(54) RUTHENIUM HYBRID FISCHER-TROPSCH CATALYST, AND METHODS FOR PREPARATION AND USE THEREOF

(75) Inventors: Kandaswamy Jothimurugesan, Hercules, CA (US); Tapan Das, Albany, CA (US); Charles L. Kibby, Benicia, CA (US); Robert J. Saxton, Pleasanton, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 316 days.

(21) Appl. No.: 12/953,024

(22) Filed: Nov. 23, 2010

(65) Prior Publication Data

US 2012/0129959 A1    May 24, 2012

(51) Int. Cl.
*C07C 27/00* (2006.01)

(52) U.S. Cl.
USPC ........................................ 518/715

(58) Field of Classification Search
USPC ........................................ 518/715
See application file for complete search history.

(56) References Cited

U.S. PATENT DOCUMENTS

| | | | |
|---|---|---|---|
| 4,157,338 A | 6/1979 | Haag et al. | |
| 4,294,725 A | 10/1981 | Fraenkel et al. | |
| 4,617,283 A | 10/1986 | Coughlin | |
| 4,617,320 A | 10/1986 | Coughlin et al. | |
| 4,622,308 A | 11/1986 | Koikeda et al. | |
| 4,632,941 A | 12/1986 | Coughlin | |
| 4,652,538 A | 3/1987 | Rabo et al. | |
| 4,663,355 A | 5/1987 | Coughlin | |
| 4,874,733 A | 10/1989 | Miller et al. | |
| 4,906,671 A | 3/1990 | Haag et al. | |
| 5,104,902 A | 4/1992 | Bessell | |
| 5,126,377 A | 6/1992 | Bessell | |
| 6,602,921 B2 | 8/2003 | Manzer et al. | |
| 6,638,889 B1 | 10/2003 | Van Berge et al. | |
| 6,649,662 B2 * | 11/2003 | Kibby ......................... | 518/715 |
| 7,157,501 B2 | 1/2007 | Steenwinkel et al. | |
| 7,300,959 B2 | 11/2007 | Vogt et al. | |
| 2010/0160464 A1 | 6/2010 | Kibby et al. | |

FOREIGN PATENT DOCUMENTS

| | | |
|---|---|---|
| CN | 101224425 | 7/2008 |
| EP | 0357830 | 3/1990 |
| EP | 1657290 | 5/2006 |
| EP | 2514525 | 10/2012 |
| RU | 2139758 | 10/1999 |
| WO | WO 99/161550 | 12/1999 |
| WO | WO 03/002252 | 1/2003 |
| WO | WO 2008/079050 | 7/2008 |
| WO | WO 2008/079051 | 7/2008 |
| WO | WO 2008/079052 | 7/2008 |
| WO | WO 2010/147513 | 12/2010 |
| ZA | 855317 | 7/1985 |

OTHER PUBLICATIONS

Zola, et al, Cobalt Supported on Different Zeolites for Fischer-Tropsch Synthesis, Nation Gas Conversion VIII. 2007.
Zhao, et al., Selective Synthesis of Middle Isoparaffins via aTwo-Stage Fischer-Tropsch Reaction: Activitity Investigation for a Hybrid Catalyst, Ind. Eng. Chem. Res. 2005, 44, pp. 769-775.
Yoneyama, et al., One-Step Synthesisof Isoparaffin from Synthesis Gas Using Hybrid Catalyst with Supercritical Butane, Energy & Fuels, Received Mar. 21, 2008.
Yang, Design and Modification of Zeolite Capsule Catalyst, a Confined Reaction Field, and its application in One-Step Isoparaffin Synthesis from Syngas, Energy & Fuels 2008, 22, 1463-1468.
Thongkam, et al., Novel Three-component Zeolite Capsule Catalyst for Direct Synthesis of Isoparaffin, Journal of the Japan Petroleum Institute, 52, (4), 216-217 (2009).
Romain, Hydrogen and oxygen adsorption stoichiometries on silica supported ruthenium nanoparticles, Lawrence Berkeley National Laboratory, Aug. 26, 2009.
Martinez, et al., The Application of Zeolites and Periodic Mesoporous Silicas in the Catalytic Conversion of Synthesis Gas, Top Catal (2009) 52: 75-90.
Martinez, et al., Catalytic behavior of hybrid Co/SiO2-(medium-pore) zeolite catalysts during the one-stage conversion of syngas to gasoline, Applied Catalysis A: General 346 (2008) 117-125.
Martinez, et al., A detaled study of the activity and deactivation of Zeolites in hybrid Co/SiO2-zeolite Fischer-Tropsch catalyst, Journal of Catalysis, 249 (2007) 162-173.
Long, et al., The Contact State Related Phenomena of Hybtid Catalysts for the Modified Fischer-Tropsch Synthesis, Catal. Lett. (2009) 131: 388-392.
Long, et al., Selective production of iso-paraffins from syngas over Co/SiO2 and Pd/Beta Hybrid Catalysts, Catalysis Communications 6 (2005) 503-506.
Li, et al., Gasoline-range hydrocarbon synthesis over Co/SiO2/HZSM-5 catalyst with CO2-containing syngas, Fuel Processing Technology 91 (2010) 388-393.
Stencel, et al., Dual Cobalt Speciation in Co/ZSM-5 Catalysts, Journal of Catalysis 84, 109-118 (1983).
T. J. Huang, et al. Aromatic Gasoline from hydrogen/Carbon Monoxide Over Ruthenium/Zeolite Catalysts, Catalytic Activation of Carbon Monoxide, ACS Symposium Series, American Chemical Society, 1981.
U.S. Appl. No. 12/343,534, filed Dec. 24, 2008.

* cited by examiner

*Primary Examiner* — Jafar Parsa
(74) *Attorney, Agent, or Firm* — Karen DiDomenicis; Richard Schulte

(57) ABSTRACT

Disclosed is a method of forming a hybrid Fischer-Tropsch catalyst extrudate for use in synthesis gas conversion reactions. The method includes extruding a mixture of ruthenium loaded metal oxide support particles, particles of an acidic component and a binder sol to form an extrudate. The resulting extrudate contains from about 0.1 to about 15 weight percent ruthenium based on the weight of the extrudate. In a synthesis gas conversion reaction, the extrudate is contacted with a synthesis gas having a $H_2$ to CO molar ratio of 0.5 to 3.0 at a reaction temperature of 160° C. to 300° C., a total pressure of 3 to 35 atmospheres, and an hourly space velocity of 5 to 10,000 v/v/hour, resulting in hydrocarbon products containing 1-15 weight % $CH_4$; 1-15 weight % $C_2$-$C_4$; 70-95 weight % $C_5^+$; 0-5 weight % $C_{21+}$ normal paraffins; and 0-10 weight % aromatic hydrocarbons.

3 Claims, No Drawings

RUTHENIUM HYBRID FISCHER-TROPSCH CATALYST, AND METHODS FOR PREPARATION AND USE THEREOF

FIELD

The present invention relates to a process for the conversion of synthesis gas to liquid hydrocarbons in the presence of a catalyst containing metal oxide supported ruthenium and a zeolite, to the preparation of the catalyst, and to the catalyst. More particularly, the present invention relates to the conversion of synthesis gas to liquid hydrocarbons using a catalyst comprising ruthenium on a solid metal oxide support extruded with an acidic zeolite.

BACKGROUND

High quality fuels remain in high demand. Fischer-Tropsch synthesis, which involves the production of hydrocarbons by the catalyzed reaction of mixtures of carbon monoxide (CO) and hydrogen ($H_2$), also referred to as synthesis gas or syngas, can convert natural gas derived synthesis gas to liquid fuels and high-value chemicals. Fischer-Tropsch synthesis is one of the more attractive, direct and environmentally acceptable paths to high quality transportation fuels derived from natural gas.

Fischer-Tropsch catalysts are typically based on group VIII metals such as, for example, iron, cobalt, nickel and ruthenium. Such known catalysts are nonselective for a particularly desired product distribution, namely high levels of $C_{5+}$ products and low levels of light gas. Processes using such catalyst are generally governed by the Anderson-Schulz-Flory (ASF) polymerization kinetics.

Hybrid Fischer-Tropsch catalysts including a Fischer-Tropsch component and an acidic component, such as a zeolite, have been found to be capable of limiting product chain growth in the Fischer-Tropsch reaction to a desired product distribution. Ruthenium, usually known as a promoter for cobalt, is a Fischer-Tropsch active metal that provides surprisingly low methane formation when used as the primary Fischer-Tropsch component Impregnation of a zeolite using an aqueous ruthenium solution followed by calcination, and activation by a reduction-oxidation-reduction cycle, as disclosed in copending U.S. patent application Ser. No. 12/797,439, reduces ruthenium ion-exchange with zeolite acid sites, thereby increasing the overall activity of the zeolite component. However, a certain fraction of ruthenium migrates into the zeolite pores and, after reduction, exists as reduced nanoclusters in the zeolite channels. Because ruthenium-catalyzed Fischer-Tropsch products are of much higher molecular weight than those from analogous cobalt-catalyzed reactions, the heavy wax is slow to diffuse out of the zeolite pores and effectively depresses the overall catalytic activity.

What is needed is a hybrid Fischer-Tropsch catalyst containing ruthenium, with its propensity for low light gas production, which limits product chain growth in the Fischer-Tropsch reaction and avoids the difficulties caused by ruthenium migrating into the pores of the support, and a method for forming such a Fischer-Tropsch catalyst. It would further be desirable to form a hydrocarbon product having a $C_{21+}$ paraffin content of 5% or less.

SUMMARY

One embodiment relates to a method for forming a catalyst for synthesis gas conversion, the method comprising:

depositing a ruthenium compound onto a metal oxide support to provide a ruthenium loaded metal oxide support;

mixing the ruthenium loaded metal oxide support with an acidic component and a binder to form a mixture;

extruding the mixture to form a synthesis gas conversion catalyst in the form of an extrudate comprising a ruthenium loaded metal oxide support and an acidic component in a binder matrix.

Another embodiment relates to a hybrid Fischer-Tropsch catalyst extrudate comprising a ruthenium loaded metal oxide support and an acidic component in a binder matrix wherein the catalyst contains from about 0.1 to about 15 weight percent ruthenium based on the weight of the extrudate.

Yet another embodiment relates to a method of performing a synthesis gas conversion reaction, the method comprising contacting the hybrid Fischer-Tropsch catalyst extrudate with a synthesis gas having a $H_2$ to CO ratio of 0.5 to 3.0 at a reaction temperature of 160° C. to 300° C., a total pressure of 3 to 35 atmospheres, and an hourly space velocity of 5 to 10,000 v/v/hours, wherein products of the synthesis gas conversion reaction comprise 1-15 weight % $CH_4$; 1-15 weight % $C_2$-$C_4$; 70-95 weight % $C_5^+$; 0-5 weight % $C_{21+}$ normal paraffins; and 0-10 weight % aromatic hydrocarbons.

DETAILED DESCRIPTION

A method for forming a hybrid Fischer-Tropsch catalyst for synthesis gas conversion is described. A ruthenium compound is deposited onto a porous solid metal oxide support to provide ruthenium loaded particles. The ruthenium loaded particles are combined with zeolite particles and a binder material. The resulting mixture is then extruded to give a shaped catalyst body, also referred to as an extrudate, containing ruthenium loaded particles and zeolite particles in a binder matrix.

As used herein, the phrase "hybrid Fischer-Tropsch catalyst" refers to a Fischer-Tropsch catalyst comprising a Fischer-Tropsch base component as well as a component containing the appropriate acidic functionality to convert the primary Fischer-Tropsch products produced by the Fischer-Tropsch base component into desired hydrocracked products and minimize the amount of heavier, undesirable products, e.g., $C_{21+}$. As used herein, the phrases "supported ruthenium catalyst" and "ruthenium loaded metal oxide support" are used interchangeably to refer to catalyst particles having ruthenium metal distributed as small particles or crystallites upon the metal oxide support.

The Fischer-Tropsch functionality of the hybrid Fischer-Tropsch catalyst is provided by ruthenium loaded particles which can be formed by any known means for depositing a ruthenium compound onto a solid metal oxide support, including, but not limited to, precipitation, impregnation and the like. Any technique known to those having ordinary skill in the art to distend the ruthenium in a uniform manner on the support is suitable. Suitable support materials include porous solid metal oxides such as alumina, silica, titania, magnesia, zirconia, chromia, thoria, boria and mixtures thereof.

Initially, the metal oxide support can be treated by oxidative calcination at a temperature in the range of from about 450° C. to about 900° C., for example, from about 600° C. to about 750° C. to remove water and any organics from the metal oxide structure.

According to one embodiment, the method employed to deposit the ruthenium onto the metal oxide support involves an impregnation technique using an aqueous or nonaqueous solution containing a soluble ruthenium compound such as, for example, a salt and, if desired, a soluble promoter metal, in order to achieve the necessary metal loading and distribution required to provide a highly selective and active catalyst. Suitable ruthenium compounds include, for example, ruthenium nitrosyl nitrate, ruthenium acetate, ruthenium carbonyl, ruthenium acetylacetonate, ruthenium chloride or the like. Other $Ru^{+3, +4, +6, +7, and +8}$ known compounds may be used.

Suitable solvents include, for example, water; ketones, such as acetone, butanone (methyl ethyl ketone); the lower alcohols, e.g., methanol, ethanol, propanol and the like; amides, such as dimethyl formamide; amines, such as butylamine; ethers, such as diethylether and tetrahydrofuran; hydrocarbons, such as pentane and hexane; and mixtures of the foregoing solvents. In an embodiment, the solvents are acetone, for ruthenium nitrate or tetrahydrofuran.

The calcined metal oxide support is then impregnated in a dehydrated state with the aqueous solution of the metal compound(s). Thus, the calcined zeolite support should not be unduly exposed to atmospheric humidity so as to become rehydrated.

Any suitable impregnation technique can be employed including techniques well known to those skilled in the art so as to distend the catalytic metals in a uniform thin layer on the metal oxide support. For example, the ruthenium along with the oxide promoter can be deposited on the metal oxide support material by the "incipient wetness" technique. Such technique is well known and requires that the volume solution be predetermined so as to provide the minimum volume which will just wet the entire surface of the metal oxide support, with no excess liquid. The solution and metal oxide support are stirred while evaporating the solvent at a temperature of from about 25° C. to about 85° C. until "dryness." Alternatively, the excess solution technique can be utilized if desired. If the excess solution technique is utilized, then the excess solvent is removed by evaporation.

The foregoing impregnation steps are repeated with additional substantially non-aqueous or aqueous solutions in order to obtain the desired metal loading. Ruthenium and other promoter metal and/or metal oxides are conveniently added together with ruthenium, but they may be added in other impregnation steps, separately or in combination, either before, after, or between impregnations of ruthenium.

The impregnated catalyst is slowly dried in air at a temperature of from about 110° C. to about 120° C. for a period of about 2 hours so as to spread the metals over the entire metal oxide support.

The dried catalyst may be calcined at a temperature high enough to form stable metal-oxygen bonds. The dried catalyst is calcined by heating slowly in flowing air, for example 10 cc/gram/minute, to a temperature in the range of from about 200° C. to about 500° C. The aforesaid drying and calcination steps can be done separately or can be combined. However, calcination should be conducted by using a slow heating rate of, for example, 0.5° C. to about 3° C. per minute or from about 0.5° C. to about 1° C. per minute and the catalyst should be held at the maximum temperature for a period of about 1 to about 20 hours, for example, for about 2 hours.

Using the above described impregnation method, ruthenium crystallites having a diameter of between about 1 nm and 20 nm are formed on the support. With ruthenium nitrate based compounds such as ruthenium nitrosyl nitrate, metal loading in a single step impregnation is limited to up to about 7 weight % ruthenium and preferably 0.5 to 5 weight % for typical alumina supports. For the purposes of illustration, Fischer-Tropsch component levels of about 3 weight % have been found suitable for use in a hybrid Fischer-Tropsch catalyst containing 80 weight % ZSM-5 and 20 weight % alumina Multiple impregnations may be needed, with alternating drying and low temperature (i.e., less than 300° C.) calcination treatments to disperse and decompose the ruthenium compounds. After drying, the ruthenium crystallites are effectively immobilized on the support.

The ruthenium loaded support optionally includes metal promoters where desired to improve the activity. Suitable promoters include iron (Fe), cobalt (Co), molybdenum (Mo), manganese (Mn), praseodymium (Pr), rhodium (Rh), platinum (Pt), palladium (Pd), copper (Cu), silver (Ag), gold (Au), zinc (Zn), cadmium (Cd), rhenium (Rh), nickel (Ni), potassium (K), chromium (Cr), zirconia (Zr), cerium (Ce) and niobium oxide. Rhenium is a promoter which favors diesel range products. Higher loadings of Ru without a promoter favor gasoline range products. In one embodiment, for a catalyst containing about 3 weight % ruthenium, the amount of rhenium can be from about 0.1 to about 1 weight %, for example, from about 0.05 to about 0.5 weight % based upon total catalyst weight. The amount of rhenium would accordingly be selected to be proportionately higher or lower for higher or lower ruthenium levels, respectively. The amount of ruthenium can be increased as the amount of alumina increases, up to about 15 weight % Ru. The ruthenium loaded support particles are then mixed with an acidic component in powder form along with a binder material and extruded to form, after drying, a shaped catalyst body or extrudate.

The weight ratio of acidic component to the ruthenium component, i.e., the weight ratio of active components, can be between 1:1 and 600:1. The weights of the acidic component and the ruthenium component are intended herein to include the weight of the active catalyst material as well as any optional metal promoters, but not the weight of any binder materials. If the ratio is below this range, the resulting product may undesirably contain solid wax. If the ratio is above this range, the product may be undesirably light and productivity may be low. In one embodiment, the weight ratio of acidic component to the ruthenium component is between 2:1 and 100:1; in another embodiment, the ratio is between 10:1 and 100:1; in yet another embodiment, the ratio is between 20:1 and 100:1; in yet another embodiment, the ratio is between 30:1 and 100:1.

The acidic component for use in the hybrid Fischer-Tropsch catalyst can be selected, by way of example and not limitation, from amorphous silica-alumina, tungstated zirconia, zeolitic crystalline small pore molecular sieves, non-zeolitic crystalline small pore molecular sieves, zeolitic crystalline medium pore molecular sieves, non-zeolitic crystalline medium pore molecular sieves, zeolitic crystalline large and extra large pore molecular sieves, non-zeolitic crystalline large and extra large pore molecular sieves, mesoporous molecular sieves and zeolite analogs. A zeolite is a molecular sieve that contains silica in the tetrahedral framework positions. Examples include, but are not limited to, silica-only (silicates), silica-alumina (aluminosilicates), silica-boron (borosilicates), silica-germanium (germanosilicates), alumina-germanium, silica-gallium (gallosilicates) and silica-titania (titanosilicates), and mixtures thereof.

Molecular sieves, in turn, are crystalline materials that have regular passages (pores). If examined over several unit cells of the structure, the pores will form an axis based on the same units in the repeating crystalline structure. While the overall path of the pore will be aligned with the pore axis, within a unit cell, the pore may diverge from the axis, and it may expand in size (to form cages) or narrow. The axis of the pore is frequently parallel with one of the axes of the crystal. The narrowest position along a pore is the pore mouth. The pore size refers to the size of the pore mouth. The pore size is calculated by counting the number of tetrahedral positions that form the perimeter of the pore mouth. A pore that has 10 tetrahedral positions in its pore mouth is commonly called a 10 membered ring pore. Pores of relevance to catalysis in the present invention have pore sizes of 8 tetrahedral positions (members) or greater. If a molecular sieve has only one type of relevant pore with an axis in the same orientation to the crystal structure, it is called 1-dimensional. Molecular sieves may have pores of different structures or may have pores with the same structure but oriented in more than one axis related to the crystal.

Small pore molecular sieves are defined herein as those having 6 or 8 membered rings; medium pore molecular sieves are defined as those having 10 membered rings; large pore molecular sieves are defined as those having 12 membered rings; extra-large molecular sieves are defined as those having 14+ membered rings.

Mesoporous molecular sieves are defined herein as those having average pore diameters between 2 and 50 nm. Representative examples include the M41 class of materials, e.g. MCM-41, in addition to materials known as SBA-15, TUD-1, HMM-33, and FSM-16.

Exemplary acidic components for use in the hybrid Fischer-Tropsch catalyst include, but are not limited to, those medium pore molecular sieves designated EU-1, ferrierite, heulandite, clinoptilolite, ZSM-11, ZSM-5, ZSM-57, ZSM-23, ZSM-48, MCM-22, NU-87, SSZ-44, SSZ-58, SSZ-35, SSZ-46 (MEL), SSZ-57, SSZ-70, SSZ-74, SUZ-4, Theta-1, TNU-9, IM-5 (IMF), ITQ-13 (ITH), ITQ-34 (ITR), and silicoaluminophosphates designated SAPO-11 (AEL) and SAPO-41 (AFO). The three letter designation is the name assigned by the IUPAC Commission on Zeolite Nomenclature.

Exemplary acidic components for use in the hybrid Fischer-Tropsch catalyst include, but are not limited to, those large pore molecular sieves designated Beta (BEA), CIT-1, Faujasite, H-Y, Linde Type L, Mordenite, ZSM-10 (MOZ), ZSM-12, ZSM-18 (MEI), MCM-68, gmelinite (GME), cancrinite (CAN), mazzite/omega (MAZ), SSZ-26 (CON), MTT (e.g., SSZ-32, ZSM-23 and the like), SSZ-33 (CON), SSZ-37 (NES), SSZ-41 (VET), SSZ-42 (IFR), SSZ-48, SSZ-55 (ATS), SSZ-60, SSZ-64, SSZ-65 (SSF), ITQ-22 (IWW), ITQ-24 (IWR), ITQ-26 (IWS), ITQ-27 (IWV), and silicoaluminophosphates designated SAPO-5 (AFI), SAPO-40 (AFR), SAPO-31 (ATO), SAPO-36 (ATS) and SSZ-51 (SFO).

Exemplary acidic components for use in the hybrid Fischer-Tropsch catalyst include, but are not limited to, those extra large pore molecular sieves designated CIT-5, UTD-1 (DON), SSZ-53, SSZ-59, and silicoaluminophosphate VPI-5 (VFI).

The acidic component can have an external surface area of between about 10 $m^2/g$ and about 300 $m^2/g$, a porosity of between about 30 and 80%, and a crush strength of between about 1.25 and 5 lb/mm Si/Al ratio for the acidic component can be 10 or greater, for example, between about 10 and 100.

For convenience, acidic components for use in the hybrid Fischer-Tropsch catalyst may be herein referred to as "zeolite supports" although it should be understood that this encompasses the above non-zeolitic materials as well as zeolitic materials.

The acidic component can optionally include a promoter selected from the group consisting of platinum, ruthenium, nickel, copper, rhodium, rhenium, palladium, silver, osmium, iridium, cobalt, gold, molybdenum, tungsten, and oxides and combinations thereof.

Suitable binder materials include, for example, sols of alumina, silica, titania, magnesia, zirconia, chromia, thoria, boria, beryllia and mixtures thereof.

By forming the extrudate to include separate particles of ruthenium loaded support and acidic component, all of the ruthenium is kept outside the acidic component channels, e.g., the channels within the zeolite.

The ruthenium loaded support, the acidic component and the binder sol are mixed by any convenient means. The mixture may be conditioned by adding water or aging the mixture to form an extrudable mass. The mixture is then extruded by forcing the mass through a die and cutting the extruded mass to the desired length using any particular method known to those of ordinary skill in the art. In one embodiment, the extrudate catalyst body is dried at a temperature of 110° C. to 130° C.

The dried catalyst may be reduced directly in hydrogen or it may be calcined first. In extrudate formation, strength is produced in a calcination step at high temperature. The calcination temperature should be high enough to cause solid state reactions between the binder and metal oxide support, to form very stable metal-oxygen bonds. The dried catalyst is calcined by heating slowly in flowing air, for example 10 cc/gram/minute, to a temperature in the range of from about 200° C. to about 500° C. The aforesaid drying and calcination steps can be done separately or can be combined. However, calcination should be conducted by using a slow heating rate of, for example, 0.5° C. to about 3° C. per minute or from about 0.5° C. to about 1° C. per minute and the catalyst should be held at the maximum temperature for a period of about 1 to about 20 hours, for example, for about 2 hours.

The extrudate is finally activated by one of a single reduction step, reduction-oxidation, or reduction-oxidation-reduction cycle.

In one embodiment, the resulting hybrid Fischer-Tropsch catalyst extrudate has a ruthenium content of from 0.1 weight % to 15 weight %; in another embodiment, the extrudate has a ruthenium content of from 0.3 to 3 weight %. The ruthenium content of the final hybrid catalyst extrudate depends on the amounts of the content of other components which dilute the total ruthenium content, i.e., metal oxide support, zeolite and binder materials used, as the total of all of the weight percentages of the catalyst components is 100%. For example, for an alumina binder content of at least about 20 weight % and a zeolite content of at least about 20 weight % based upon the weight of the final hybrid catalyst extrudate, the catalyst can contain from 0.1 weight % to 5 weight % ruthenium, preferably 0.2 to 2 weight % ruthenium, based on total catalyst weight, at the lowest content of ruthenium and metal oxide support. At the highest content of ruthenium and metal oxide support, the catalyst can contain, for example, from about 1 to about 15 weight % ruthenium, preferably from about 0.2 to about 2 weight % ruthenium, based on the weight of the final hybrid catalyst extrudate.

In one embodiment, no cobalt compounds are added during the catalyst preparation and the extrudate is essentially free of cobalt. By essentially free of cobalt is meant that the extrudate contains less than 0.1 weight percent cobalt.

In one embodiment, the hybrid Fischer-Tropsch catalyst has an average particle diameter, which depends upon the type of reactor to be utilized, of from about 0.01 to about 6 mm; for example, from about 1 to about 6 mm for a fixed bed; and for example, from about 0.01 to about 0.11 mm for a reactor with the catalyst suspended by gas, liquid, or gas-liquid media (e.g., fluidized beds, slurries, or ebullating beds). Particle diameter can be determined using any means known to one skilled in the art, including, but not limited to, sieving or screening, observing the rate of sedimentation, observation via microscopy, etc. For the purposes of the present invention, particle diameter is determined by sieving. The catalyst can be applied in conventional multi-tubular, fixed bed reactors in various known process configurations, including recycle operation of a single reactor, series operation of several reactors, dry gas recycle, hydrocarbon liquid recycle, etc.

Wide variations in macroporosity are possible with the extrudates. For the present embodiments, without wishing to be bound by a particular theory, it is believed that the highest macroporosity possible, consistent with sufficient crush strength to enable operation in long multi-tubular reactor tubes such as those found in multi-tubular fixed bed reactors, is advantageous in minimizing diffusion constraints on catalyst activity and product selectivity. The zeolite-mediated Fischer-Tropsch synthesis according to the present embodiments is not as diffusion-limited as that of conventional Fischer-Tropsch synthesis, since the pores of the presently disclosed zeolite supported Fischer-Tropsch catalyst remain open during operation, whereas the pores of a conventional Fischer-Tropsch catalyst fill with oil (melted wax).

In one embodiment, the hybrid Fischer-Tropsch catalyst has a pore volume between about 0.2 and about 0.5 cm$^3$ per gram. In one embodiment, the hybrid Fischer-Tropsch catalyst has a BET surface area between about 150 and about 500 m$^2$ per gram. In one embodiment, the hybrid Fischer-Tropsch catalyst has an acidity between about 300 and about 800 μmol per gram.

Use of the extruded hybrid Fischer-Tropsch catalysts disclosed herein has been found to be beneficial as the relatively larger extrudate particles avoid high pressure drop within a syngas conversion reactor and are subject to less attrition than zeolite powder or even granular zeolite (e.g., having a particle size of about 300-1000 μm).

A process for performing a synthesis gas conversion reaction using the hybrid Fischer-Tropsch catalyst disclosed herein is now described. The feed gas is a mixture of CO and hydrogen, also referred to as synthesis gas or syngas. Any suitable source of syngas can be used. The feed gas can be obtained, for example, by (i) the oxidation of coal or other forms of carbon with scrubbing or other forms of purification to yield the desired mixture of CO and H$_2$ or (ii) the reforming of natural gas. The feed gas has a H$_2$ to CO molar ratio of 0.5 to 3.0. CO$_2$ is not a desirable component of the feed for use in the process of the present invention, but it may be present as a diluent gas. Sulfur compounds in any form are deleterious to the life of the catalyst and should be removed from the syngas and from any diluent gases.

The reaction temperature is suitably from about 160° C. to about 300° C. for example, from about 175° C. to about 280° C. or from about 185° C. to about 275° C. The total pressure is, for example, from about 1 to about 100 atmospheres, for example, from about 3 to about 35 atmospheres or from about 5 to about 30 atmospheres.

The gaseous hourly space velocity based upon the total amount of feed is less than 20,000 volumes of gas per volume of catalyst per hour, for example, from about 5 to about 10,000 v/v/hour, even 100 to about 5000 v/v/hour, or even from about 1000 to about 2500 v/v/hour. If desired, pure synthesis gas can be employed or, alternatively, an inert diluent, such as nitrogen, CO$_2$, methane, steam or the like can be added. The phrase "inert diluent" indicates that the diluent is non-reactive under the reaction conditions or is a normal reaction product.

The synthesis gas reaction using the catalysts of the present invention can occur in a fixed, fluid or moving bed type of operation.

The hydrocarbon mixture formed in the reaction can range from methane to light wax, containing only trace amounts (<0.5 wt %) of carbon numbers above 30, and may include linear, branched and cyclic compounds. As defined herein, the terms "wax" and "solid wax" refer to $C_{21+}$ normal paraffins. The terms "Fischer-Tropsch wax" and "$C_{21+}$ wax" are also used herein interchangeably to refer to $C_{21+}$ normal paraffins.

The combination of a ruthenium-based Fischer-Tropsch component with an acidic component (e.g., zeolite) results in enhanced selectivity for desirable products, i.e., low CH$_4$ levels, high $C_{5+}$ levels and low $C_{21+}$ n-paraffins. The branched nature of the carbon chain products make them beneficial for transportation fuels having low temperature pour, cloud or freeze points. Waxy products formed on the ruthenium component are cracked (i.e., by the acidic component) into mainly branched hydrocarbons with limited formation of aromatics. In one embodiment, in a single-stage Fischer-Tropsch reaction, the presently disclosed hybrid Fischer-Tropsch catalyst provides the following product at ambient conditions:

1-15 weight % CH$_4$;
1-15 weight % $C_2$-$C_4$;
70-95, weight % $C_{5+}$;
0-5 weight % $C_{21+}$ normal paraffins; and
0-10, or even 0-5, weight % aromatic hydrocarbons.

In one embodiment, the hydrocarbon mixture produced is substantially free of solid wax by which is meant that the product is a single liquid phase at ambient conditions without the visibly cloudy presence of an insoluble solid wax phase. According to this embodiment, the hydrocarbon mixture produced contains 0-5 weight % $C_{21+}$ normal paraffins at ambient conditions. In a typical Fischer-Tropsch process, the product obtained is predominantly a normal or linear paraffin product, meaning free of branching. If the $C_{21+}$ fraction present within a $C_{5+}$ product is predominantly linear and greater than 5 weight %, the product has been found to contain a separate, visible solid wax phase. Products of the present process may actually contain $C_{21+}$ at greater than 5 weight % without a visible solid wax phase. Branched paraffins have lower melting points compared with normal or linear paraffins such that products of the present process can contain a greater percentage of $C_{21+}$ fraction and still remain a liquid which is free of a separate, visible solid wax phase at ambient conditions. The result is a product which is liquid and pourable at ambient conditions. Liquid hydrocarbons produced by the present process advantageously have a cloud point as determined by ASTM D 2500-09 of 15° C. or less, even 10° C. or less, even 5° C. or less, and even as low as 2° C.

By "ambient conditions" is meant a temperature of 15° C. and a pressure of 1 atmosphere (100 kPa).

The following illustrative examples are intended to be non-limiting.

EXAMPLES

Test Methods

Surface area, pore volume and pore size distribution of catalyst samples were determined by N$_2$ physisorption using Micromeritics® Tristar® 3000 automated system (available from Micromeritics Instrument Corporation, Norcross, Ga.). The surface area was calculated following the BET method and the micropore volume was calculated following the deBoer t-plot method.

Porosity of catalyst samples was assessed by mercury intrusion porosimetry in a Micromeritics® Autopore® IV 9500 porosimeter.

Crush strength of catalyst samples was determined using an Instron® Universal Testing Machine (available from Illinois Tool Works Inc., Norwood, Mass.). The crush strength is the mass required measured in pounds to break a particle, divided by particle length measured in millimeters, averaged over 50 particles.

Crystallite diameter was calculated using $H_2$ chemisorption data assuming crystallites are spherical in shape, and reported in nm.

Acidity was determined by TGA-Mass Spectrometer analysis of the desorption-decomposition of adsorbed isopropylamine as described by Gorte (R. J. Gorte, Catalysis Letters 62 (1999) pp 1-13). Ten milligram catalyst samples were reduced in hydrogen by heating them at 10° C./minute to 500° C. in 5 vol % $H_2$-95 vol % Ar and holding for 1 hour at the maximum temperature. Samples were then cooled in flowing nitrogen to 150° C. and isopropylamine was added by switching the nitrogen flow through a bubbler containing liquid isopropylamine at 20° C. The addition was continued until saturation as indicated by no further weight gain. Typically, this took about one hour. The samples were then purged in nitrogen for 30 minutes at 150° C. to remove physisorbed isopropylamine from the system. Desorption/reaction of the adsorbed isopropylamine was accomplished by slowly heating in nitrogen. The heating rate was 2° C./minute from 150° C. to 250° C., then slowed to 0.5° C./minute from 250° C. to 350° C., and increased to 5° C./minute for temperatures between 350° C. and 500° C. During the first ramp, weakly adsorbed isopropylamine desorbed from the alumina-bound zeolite. During the slow ramp, isopropylammonium ions at Brönsted sites decomposed to propylene and ammonia and regenerated the original acidic hydroxyl groups. This occurred at 305° C.-320° C. Immediately after that, isopropylamine on cobalt or ruthenium decomposed and/or desorbed. Acidity was determined by integrating the decomposition/desorption peak at 305° C.-320° C. and counting one acidic proton site for each molecule of isopropylamine that decomposed.

Cloud point is determined by ASTM D 2500-09.

Example 1

Preparation of 2% Ru-2% Mn/40% ZSM-5/56% $Al_2O_3$ Catalyst Extrudate

5% Ru-5% Mn/$Al_2O_3$ was first prepared as follows. An alumina support was obtained from Sasol Chemicals North America LLC (Houston, Tex.) and the BET surface area was 203 $m^2$/g. First, the alumina support was impregnated by an aqueous solution of $Mn(NO_3)_2.6H_2O$ (from Sigma-Aldrich, St. Louis, Mo.) in an amount about three times the pore volume of the alumina support. The solvent was then removed in a rotary evaporator under vacuum by heating slowly to 65° C. The vacuum-dried material was then further dried in air at 120° C. for 16 hours in a box furnace and then it was subsequently calcined in air by raising its temperature at a heating rate of 2° C./min to 600° C. and holding it at that temperature for 2 hours before cooling it back to ambient temperature. Next, ruthenium was incorporated by impregnating the support with an aqueous solution of $RuCl_3.3H_2O$ (from Alfa Aesar, Ward Hill, Mass.) in an amount about three times the pore volume of the alumina support. After removal of the solvent by heating, the dried material was further dried in air at 120° C. for 16 hours in a box furnace and then it was subsequently calcined in air by raising its temperature at a heating rate of 2° C./min to 450° C. and holding it at that temperature for 2 hours. Properties of the catalyst are given below.

| BET Surface Area, $m^2$/g | Pore volume, $cm^3$/g | Dispersion, % | Crystallite Particle Diameter, nm |
|---|---|---|---|
| 172.3 | 0.41 | 16.87 | 8 |

ZSM-5 zeolite powder was first calcined at 550° C. for 2 h (Zeolyst CBV 8014 having a Si/Al ratio of 40 available from Zeolyst International, Conshohocken, Pa.). Then the supported Ru—Mn/alumina catalyst prepared above, ZSM-5 powder and 20 wt % catapal B alumina binder were added to a mixer and mixed for 15 minutes, resulting in an extrudate having 40 wt % ZSM-5 and 56 wt % alumina. Deionized water and a small amount of nitric acid was added to the mixed powder and mixed for 15 minutes. The mixture was then transferred to a 1 inch (2.54 cm) Bonnot BB Gun extruder and extruded using a ¹⁄₁₆" (0.16 cm) dieplate containing 36 holes. The Ru integral catalyst extrudate was dried first at 120° C. for 2 hours and then finally calcined in flowing air at 500° C., 2 hours. Properties of the catalyst are given below.

| Catalyst Composition | Micropore area, $m^2$/g | Micropore Volume, cc/g | BET Surface Area, $m^2$/g | Pore volume, $cm^3$/g | Acidity μmol/g-Zeolite |
|---|---|---|---|---|---|
| 2Ru/2Mn/40 ZSM-5/56%$Al_2O_3$ | 94.4 | 0.0440 | 284.9 | 0.3824 | 396 |

Catalyst Activation

Ten grams of catalyst prepared as described above was charged to a glass tube reactor. The reactor was placed in a muffle furnace with upward gas flow. The tube was purged first with nitrogen gas at ambient temperature, after which time the gas feed was changed to pure hydrogen with a flow rate of 750 sccm. The temperature to the reactor was increased to 350° C. at a rate of 1° C./minute and then held at that temperature for six hours. After this time, the gas feed was switched to nitrogen to purge the system and the unit was then cooled to ambient temperature. Then a gas mixture of 1 volume % $O_2/N_2$ was passed up through the catalyst bed at 750 sccm for 10 hours to passivate the catalyst. No heating was applied, but the oxygen chemisorption and partial oxidation exotherm caused a momentary temperature rise. After 10 hours, the gas feed was changed to pure air, the flow rate was lowered to 200 sccm and the temperature was raised to 300° C. at a rate of 1° C./minute and then kept at 300° C. for two hours. At this point, the catalyst was cooled to ambient temperature and discharged from the glass tube reactor. It was transferred to a 316-SS tube reactor of 0.51" (1.3 cm) I.D. and placed in a clam-shell furnace. The catalyst bed was flushed with a downward flow of helium for a period of two hours, after which time the gas feed was switched to pure hydrogen at a flow rate of 500 sccm. The temperature was slowly raised to 120° C. at a temperature interval of 1° C./minute, held there for a period of one hour, then raised to 250° C. at a temperature interval of 1° C./minute and held at that temperature for 10 hours. After this time, the catalyst bed was cooled to 180° C. while remaining under a flow of pure hydrogen gas. All flows were directed downward.

Fischer-Tropsch Activity

Catalysts prepared and activated as described above were subjected to a synthesis run in which the catalyst was contacted with syngas having hydrogen to carbon monoxide ratios between 0.5 and 2.0 at temperatures between 205° C. and 250° C., with a total pressure of 5-20 atm (gauge) and a total gas flow rate of 500-6000 cubic centimeters of gas (0° C., 1 atm) per gram of catalyst per hour.

TABLE 1

| Conditions | | | | | |
|---|---|---|---|---|---|
| Time on stream (TOS), h | 95 | 121 | 385 | 606 | 631 |
| Temperature, ° C. | 215 | 220 | 240 | 240 | 240 |
| Pressure, atm | 20 | 20 | 20 | 20 | 20 |
| $SV_{FT}$, mL/g/h | 2100 | 2100 | 500 | 1000 | 500 |
| $H_2$/CO Inlet to Reactor | 2.00 | 2.00 | 0.85 | 0.70 | 1.00 |
| Recycle Ratio | 0 | 0 | 1 | 0 | 1 |
| Results | | | | | |
| $H_2$ Conversion, mole % | 29.1 | 34.1 | 87.6 | 55.0 | 81.0 |
| CO Conversion, mole % | 24.1 | 28.7 | 56.7 | 15.4 | 55.8 |
| Rate, g $CH_2$/g/h | 0.10 | 0.12 | 0.07 | 0.06 | 0.07 |
| $Rate_{FT}$, $mLC_{5+}$/g/h | 0.08 | 0.09 | 0.07 | 0.05 | 0.07 |
| $CO_2$, selectivity | 3.1 | 2.6 | 6.7 | 8.3 | 6.4 |
| $CH_4$, selectivity | 18.8 | 21.9 | 7.9 | 5.8 | 8.6 |
| $C_2$, selectivity | 3.3 | 3.6 | 2.1 | 2.0 | 2.2 |
| $C_3$, selectivity | 10.9 | 10.1 | 4.7 | 10.0 | 5.7 |
| $C_4$, selectivity | 7.7 | 7.8 | 4.3 | 7.4 | 5.8 |
| $C_{5+}$, selectivity | 56.1 | 53.9 | 74.4 | 66.5 | 71.4 |
| $C_{21+}$, selectivity | 3.1 | 3.2 | 0.0 | 0.1 | 0.0 |

Example 2

Preparation of 1.5% Ru/1.5% Mn/49.3% beta/47.7% $Al_2O_3$ Catalyst Extrudate

Gamma alumina support was obtained from Sasol and the BET surface area was 203 $m^2$/g. First, the alumina support was impregnated by an aqueous solution of $Mn(NO_3)_2 \cdot 6H_2O$ (from Sigma-Aldrich) in an amount about three times the pore volume of the alumina support, and then the solvent was removed in a rotary evaporator under vacuum by heating slowly to 65° C. The vacuum-dried material was then further dried in air at 120° C. for 16 hours in a box furnace and then it was subsequently calcined in air by raising its temperature at a heating rate of 2° C./min to 600° C. and holding it at that temperature for 2 hours before cooling it back to ambient temperature. Next, ruthenium was incorporated by impregnating the support with an aqueous solution of $RuCl_3 \cdot 3H_2O$ (from Alfa Aesar) in an amount about three times the pore volume of the alumina support. After removal of the solvent by heating, the dried material was further dried in air at 120° C. for 16 hours in a box furnace and then it was subsequently calcined in air by raising its temperature at a heating rate of 2° C./min to 450° C. and holding it at that temperature for 2 hours.

Beta zeolite powder (Zeolyst CP814C available from Zeolyst International, having a $SiO_2/Al_2O_3$ ratio of 38) was first calcined at 550° C. for 2 hours. Then the supported Ru—Mn/alumina catalyst prepared above, beta zeolite powder and 20 wt % catapal B alumina binder were added to a mixer and mixed for 15 minutes, resulting in an extrudate having 49.3 wt % beta zeolite and 47.7 wt % alumina. Deionized water and a small amount of nitric acid were added to the mixed powder and mixed for 15 minutes. The mixture was then transferred to a 1 inch (2.54 cm) Bonnot BB Gun extruder and extruded using a 1/16" (0.16 cm) dieplate containing 36 holes. The Ru integral catalyst extrudate was dried first at 120° C. for 2 h and then finally calcined in flowing air at 600° C. for two hours. The final catalyst had a composition of 1.5% Ru/1.5% Mn/49.3% beta/47.7% $Al_2O_3$. Properties of the catalyst are given below.

| Catalyst Composition | Micropore area, $m^2$/g | Micropore Volume, cc/g | BET Surface Area, $m^2$/g | Pore volume, $cm^3$/g | Acidity µmol/g-Zeolite |
|---|---|---|---|---|---|
| 1.5Ru/1.5Mn/49.3 Beta/47.7%$Al_2O_3$ | 205.1 | 0.096 | 379.0 | 0.462 | 730 |

Catalyst Activation 20 grams of 1.5% Ru/1.5% Mn/49.3% beta/47.7% $Al_2O_3$ catalyst prepared as described above was charged to a glass tube reactor. The reactor was placed in a muffle furnace with upward gas flow. The tube was purged first with nitrogen gas at ambient temperature, after which time the gas feed was changed to pure hydrogen with a flow rate of 750 sccm. The temperature to the reactor was increased to 350° C. at a rate of 1° C./minute and then held at that temperature for six hours. After this time, the gas feed was switched to nitrogen to purge the system and the unit was then cooled to ambient temperature. Then a gas mixture of 1 volume % $O_2/N_2$ was passed up through the catalyst bed at 750 sccm for 10 hours to passivate the catalyst. No heating was applied, but the oxygen chemisorption and partial oxidation exotherm caused a momentary temperature rise. After 10 hours, the gas feed was changed to pure air, the flow rate was lowered to 200 sccm and the temperature was raised to 300° C. at a rate of 1° C./minute and then kept at 300° C. for two hours. At this point, the catalyst was cooled to ambient temperature and discharged from the glass tube reactor. It was transferred to a 316-SS tube reactor of 0.51" (1.3 cm) I.D. and placed in a clam-shell furnace. The catalyst bed was flushed with a downward flow of helium for a period of two hours, after which time the gas feed was switched to pure hydrogen at a flow rate of 500 sccm. The temperature was slowly raised to 120° C. at a temperature interval of 1° C./minute, held there for a period of one hour, then raised to 250° C. at a temperature interval of 1° C./minute and held at that temperature for 10 hours. After this time, the catalyst bed was cooled to 180° C. while remaining under a flow of pure hydrogen gas. All flows were directed downward.

Fischer-Tropsch Activity

Catalysts prepared and activated as described above were subjected to a synthesis run in which the catalyst was contacted with hydrogen and carbon monoxide at the conditions listed in Table 2. The results are also provided in Table 2.

TABLE 2

| Conditions | | | | | | |
|---|---|---|---|---|---|---|
| TOS, h | 47 | 73 | 96 | 342 | 363 | 384 |
| Temperature, °C. | 220 | 225 | 230 | 235 | 240 | 250 |
| Pressure, atm | 20 | 20 | 20 | 20 | 20 | 20 |
| SV Total, mL/g/h | 1000 | 1000 | 1000 | 1000 | 1000 | 1000 |
| $H_2$/CO Inlet to Reactor | 1 | 1 | 1 | 1 | 1 | 1 |
| Results | | | | | | |
| $H_2$ Conversion, mole % | 54.4 | 57.7 | 58.5 | 53.4 | 57.4 | 66.9 |
| CO Conversion, mole % | 27.1 | 27.6 | 28.1 | 24.2 | 24.7 | 28.3 |
| Rate, $gCH_2$/g/h | 0.085 | 0.086 | 0.088 | 0.076 | 0.077 | 0.088 |
| Rate FT, $mLC_{5+}$/g/h | 0.091 | 0.093 | 0.093 | 0.075 | 0.075 | 0.084 |
| Rate Total, $mLC_{5+}$/g/h | 0.091 | 0.093 | 0.093 | 0.075 | 0.075 | 0.084 |
| $CO_2$, selectivity | 3.9 | 4.0 | 4.1 | 5.1 | 5.4 | 5.1 |
| $CH_4$, selectivity | 2.6 | 2.9 | 3.4 | 5.2 | 6.1 | 7.4 |
| $C_2$, selectivity | 1.0 | 1.1 | 1.2 | 1.4 | 1.6 | 1.7 |
| $C_3$, selectivity | 6.3 | 6.2 | 6.2 | 7.4 | 7.5 | 7.3 |
| $C_4$, selectivity | 5.5 | 5.3 | 5.4 | 6.4 | 6.4 | 6.8 |
| $C_{5+}$, selectivity | 80.7 | 80.5 | 79.7 | 74.6 | 72.9 | 71.7 |
| $C_{21+}$, selectivity | 2.8 | 0.0 | 2.7 | 0.5 | 2.0 | 0.1 |

While ruthenium has been used as a promoter for cobalt, it is surprising that significant carbon numbers in the fuel range with low amounts of $C_{4-}$ products and low amounts of $C_{20+}$ products can be achieved with a combination of ruthenium and a zeolite such as, for instance, beta or ZSM-5. While various embodiments have been described, it is to be understood that variations and modifications may be resorted to as will be apparent to those skilled in the art. Such variations and modifications are to be considered within the purview and scope of the claims appended hereto.

What is claimed is:

1. A method of performing a synthesis gas conversion reaction, the method comprising contacting a hybrid Fischer-Tropsch catalyst extrudate comprising: a ruthenium loaded metal oxide support and an acidic component in a binder matrix wherein the hybrid Fischer-Tropsch catalyst extrudate contains from about 1.5 to about 15 weight percent ruthenium based on the weight of the extrudate with a synthesis gas having a $H_2$ to CO ratio of 0.5 to 3.0 at a reaction temperature of 160° C. to 300° C., a total pressure of 3 to 35 atmospheres, and an hourly space velocity of 5 to 10,000 v/v/hour, wherein products of the synthesis gas conversion reaction comprise 1-15 weight % $CH_4$; 1-15 weight % $C_2$-$C_4$; 70-95 weight % $C_{5+}$; 0-5 weight % $C_{21+}$ normal paraffins; and 0-10 weight % aromatic hydrocarbons.

2. The method of claim 1, wherein the products are substantially free of solid wax at ambient conditions.

3. The method of claim 1, wherein the products have a cloud point no greater than 15° C.

* * * * *